United States Patent [19]

Schultz et al.

[11] Patent Number: 5,149,984
[45] Date of Patent: Sep. 22, 1992

[54] ELECTRIC POWER SUPPLY FOR USE DOWNHOLE

[75] Inventors: Roger L. Schultz, Richardson; Kevin R. Manke, Flower Mound; Neal G. Skinner, Lewisville; William L. Bohan, Garland; Allen R. Young, Arlington, all of Tex.

[73] Assignee: Halliburton Company, Dallas, Tex.

[21] Appl. No.: 658,478

[22] Filed: Feb. 20, 1991

[51] Int. Cl.⁵ .................. F03B 13/02; F03B 13/10; F01B 23/10
[52] U.S. Cl. ..................... 290/54; 290/1 R; 290/43; 310/87
[58] Field of Search ............ 290/1 R, 52, 54, 55, 290/43; 310/75 R, 87

[56] References Cited

U.S. PATENT DOCUMENTS

| | | | |
|---|---|---|---|
| 2,978,634 | 4/1961 | Arps | 310/75 R |
| 3,780,809 | 12/1973 | Ayers, Jr. et al. | 166/314 |
| 3,800,277 | 3/1974 | Patton et al. | 340/18 LD |
| 3,896,667 | 7/1975 | Jeter | 73/151 |
| 4,103,281 | 7/1978 | Strom et al. | 340/18 LD |
| 4,132,269 | 1/1979 | Chasteen | 290/52 |
| 4,206,608 | 6/1980 | Bell | 290/55 |
| 4,266,606 | 5/1981 | Stone | 166/113 |
| 4,347,900 | 9/1982 | Barrington | 166/380 |
| 4,369,373 | 1/1983 | Wiseman | 290/54 |
| 4,375,239 | 3/1983 | Barrington et al. | 166/336 |
| 4,378,850 | 4/1983 | Barrington | 166/373 |
| 4,422,506 | 12/1983 | Beck | 166/324 |
| 4,711,305 | 12/1987 | Ringgenberg | 166/336 |
| 4,712,613 | 12/1987 | Nieuwstad | 166/53 |
| 4,796,699 | 1/1989 | Upchurch | 166/250 |
| 4,805,407 | 2/1989 | Buchanan | 60/517 |
| 4,856,595 | 8/1989 | Upchurch | 166/374 |
| 4,866,607 | 9/1989 | Anderson et al. | 364/422 |
| 4,896,722 | 1/1990 | Upchurch | 166/250 |
| 4,915,168 | 4/1990 | Upchurch | 166/250 |

Primary Examiner—A. D. Pellinen
Assistant Examiner—Robert Lloyd Hoover
Attorney, Agent, or Firm—James R. Duzan; C. Dean Domingue; L. Wayne Beavers

[57] ABSTRACT

A downhole electrical power supply apparatus has a high fluid pressure source zone and a low fluid pressure discharge zone each defined at least partially within the apparatus. A fluid powered engine provides rotational mechanical output and is powered by fluid flowing from the source zone through the engine to the discharge zone. An electrical powered generator converts the rotational mechanical output of the engine into electrical output.

30 Claims, 6 Drawing Sheets

ELECTRIC POWER SUPPLY FOR USE DOWNHOLE

BACKGROUND OF THE INVENTION

1. Field Of The Invention

The present invention relates generally to electrical power sources for use downhole.

2. Description Of The Prior Art

Typical prior art downhole power sources have taken the form of batteries. The use of downhole electronic equipment necessarily entails a problem with the use of batteries due to the very high temperatures encountered. Presently, the maximum temperature at which available batteries will perform reliably is 200° C. Many downhole applications will encounter higher temperatures and other severe environmental factors making the use of batteries undesirable.

SUMMARY OF THE INVENTION

The present invention provides a downhole electrical power supply apparatus. A high pressure fluid source zone and a low pressure fluid discharge zone are each defined at least partially within the apparatus. A fluid powered engine means is powered by fluid flowing from the source zone through the engine to the discharge zone to create a rotational mechanical output from the engine. An electrical power generating means converts the rotational mechanical output of the engine into an electrical output.

An electrical processing means is provided for processing the electrical output from the generator to provide a smoothed direct current electrical output which can be readily utilized by various electrically powered downhole tools. Various sources of fluid pressure to the high pressure source zone of the tool are disclosed.

Numerous objects, features and advantages of the present invention will be readily apparent to those skilled in the art upon a reading of the following disclosure when taken in conjunction with the accompanying drawings.

BRIEF DESCRIPTION OF THE DRAWINGS

FIG. 5 is a schematic illustration of a fourth embodiment of the invention wherein the fluid pressure differential between the well annulus and tubing pressure is utilized to power the hydraulic motor. Isolation chambers isolate the hydraulic motor from contaminating contact with the well fluid from the well annulus.

DETAILED DESCRIPTION OF THE PREFERRED EMBODIMENTS

The Background Environment Of The Invention

It is appropriate at this point to provide a description of the environment in which the present invention is used. During the course of drilling an oil well, the bore hole is filled with a fluid known as drilling fluid or drilling mud. One of the purposes of this drilling fluid is to contain in intersected formations any formation fluid which may be found there. To contain these formation fluids the drilling mud is weighted with various additives so that the hydrostatic pressure of the mud at the formation depth is sufficient to maintain the formation fluid within the formation without allowing it to escape into the borehole. Drilling fluids and formation fluids can all be generally referred to as well fluids.

When it is desired to test the production capabilities of the formation, a testing string is lowered into the borehole to the formation depth and the formation fluid is allowed to flow into the string in a controlled testing program.

Sometimes, lower pressure is maintained in the interior of the testing string as it is lowered into the borehole. This is usually done by keeping a formation tester valve in the closed position near the lower end of the testing string. When the testing depth is reached, a packer is set to seal the borehole, thus closing the formation from the hydrostatic pressure of the drilling fluid in the well annulus. The formation tester valve at the lower end of the testing string is then opened and the formation fluid, free from the restraining pressure of the drilling fluid, can flow into the interior of the testing string.

At other times the conditions are such that it is desirable to fill the testing string above the formation tester valve with liquid as the testing string is lowered into the well. This may be for the purpose of equalizing the hydrostatic pressure head across the walls of the test string to prevent inward collapse of the pipe and/or may be for the purpose of permitting pressure testing of the test string as it is lowered into the well.

The well testing program includes intervals of formation flow and intervals when the formation is closed in. Pressure recordings are taken throughout the program for later analysis to determine the production capability of the formation. If desired, a sample of the formation fluid may be caught in a suitable sample chamber.

At the end of the well testing program, a circulation valve in the test string is opened, formation fluid in the testing string is circulated out, the packer is released, and the testing string is withdrawn.

Figure 1:
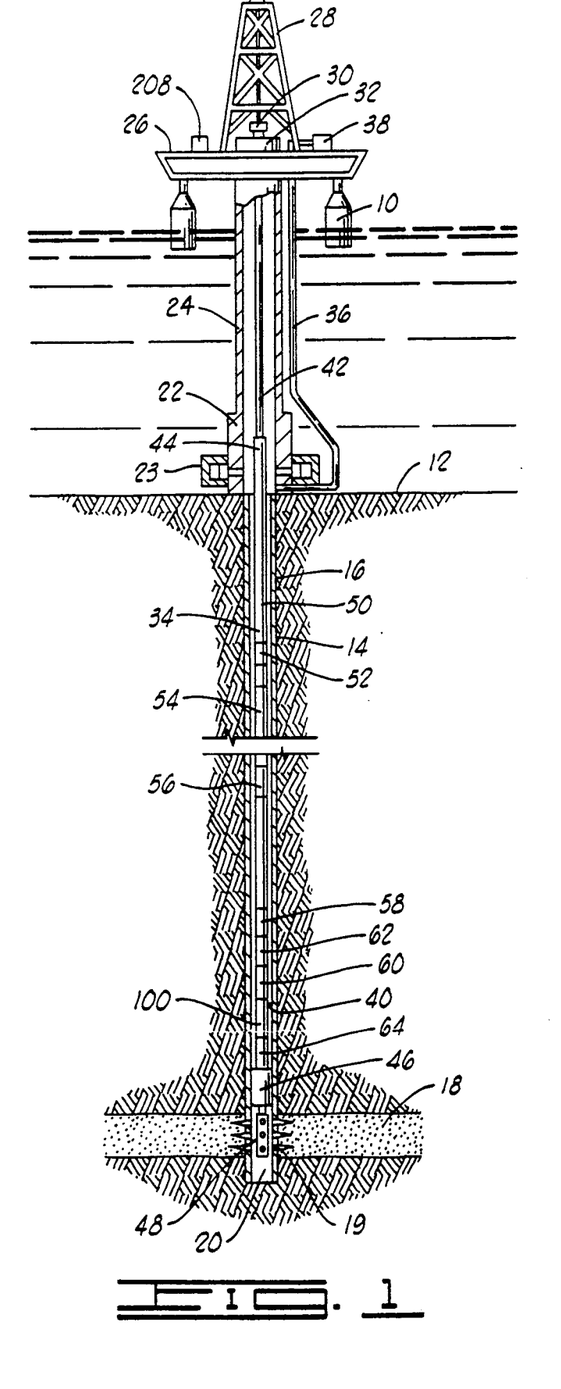
FIG. 1 is an elevation schematic view of a typical well test string in which the present invention may be incorporated.

A typical arrangement for conducting a drill stem test offshore is shown in FIG. 1. Of course, the apparatus and methods of the present invention may also be used on wells located onshore.

The arrangement of the offshore system includes a floating work station 10 stationed over a submerged work site 12. The well comprises a well bore 14, which typically is lined with a casing string 16 extending from the work site 12 to a submerged formation 18.

The casing string includes a plurality of perforations 19 at its lower end which provide communication between the formation 18 and a lower interior zone or annulus 20 of the well bore 14.

At the submerged well site 12 is located the well head installation 22 which includes blowout preventer mechanisms 23. A marine conductor 24 extends from the well head installation 22 to the floating work station 10. The floating work station 10 includes a work deck 26 which supports a derrick 28. The derrick 28 supports a hoisting means 30. A well head closure 32 is provided at the upper end of the marine conductor 24. The well head closure 32 allows for lowering into the marine conductor and into the well bore 14 a formation testing string 34 which is raised and lowered in the well by the hoisting means 30. The testing string 34 may also generally be referred to as a tubing string 34.

A supply conduct 36 is provided which extends from a hydraulic pump 38 on the deck 26 of the floating station 10 and extends to the well head installation 22 at a point below the blowout preventer 23 to allow the pressurizing of the well annulus 40 defined between the testing string 34 and the well bore 14.

The testing string 34 includes an upper conduit string portion 42 extending from the work deck 26 to the well head installation 22. A subsea test tree 44 is located at the lower end of the upper conduit string 42 and is landed in the well head installation 22.

The lower portion of the formation testing string 34 extends from the test tree 44 to the formation 18. A packer mechanism 46 isolates the formation 18 from fluids in the well annulus 40. Thus, an interior or tubing string bore of the tubing string 34 is isolated from the upper well annulus 40 above packer 46. Also, the upper well annulus 40 above packer 46 is isolated from the lower zone 20 of the well which is often referred to as the rat hole 20.

A perforated tail piece 48 provided at the lower end of the testing string 34 allows fluid communication between the formation 18 and the interior of the tubular formation testing string 34. The interior of the tubing string also communicates with the rathole 20.

The lower portion of the formation testing string 34 further includes intermediate conduit portion 50 and torque transmitting pressure and volume balanced slip joint means 52. An intermediate conduit portion 54 is provided for imparting packer setting weight to the packer mechanism 46 at the lower end of the string.

It is many times desirable to place near the lower end of the testing string 34 a circulation valve 56 which may be opened by rotation or reciprocation of the testing string or a combination of both or by dropping of a weighted bar in the interior of the testing string 34. Below circulating valve 56 there may be located a combination sampler valve section and reverse circulation valve 58.

Also near the lower end of the formation testing string 34 is located a formation tester valve 60. Immediately above the formation tester valve 60 there may be located a drill pipe tester valve 62.

A pressure recording device 64 is located below the formation tester valve 60. The pressure recording device 64 is preferably one which provides a full opening passageway through the center of the pressure recorder to provide a full opening passageway through the entire length of the formation testing string.

Various ones of the tools utilized in the testing string 34, such as for example the formation tester valve 60 and/or the reverse circulation valve 58 may be designed to utilize electrical power for part of the operation thereof. For example, the formation tester valve and reverse circulation valve may be constructed in accordance with the electrically powered remote control tool design set forth in U.S. patent application Ser. No. 07/658,479 of Schultz et al., entitled DIFFERENTIAL ACTUATING SYSTEM FOR DOWNHOLE TOOLS, filed concurrently herewith, the details of which are incorporated herein by reference.

The present invention relates to a system for generating electrical power downhole, and the power generation system of the present invention may be utilized in connection with electrically powered tools like those described in the above-incorporated co-pending application.

In such an instance, where the present invention is utilized to generate electrical power for the formation tester valve 60 and the reverse circulation valve 58, the apparatus of the present invention which is generally designated by the numeral 100 would be located within the testing string 34 closely adjacent the devices to be powered as generally illustrated in FIG. 1.

Figure 2:
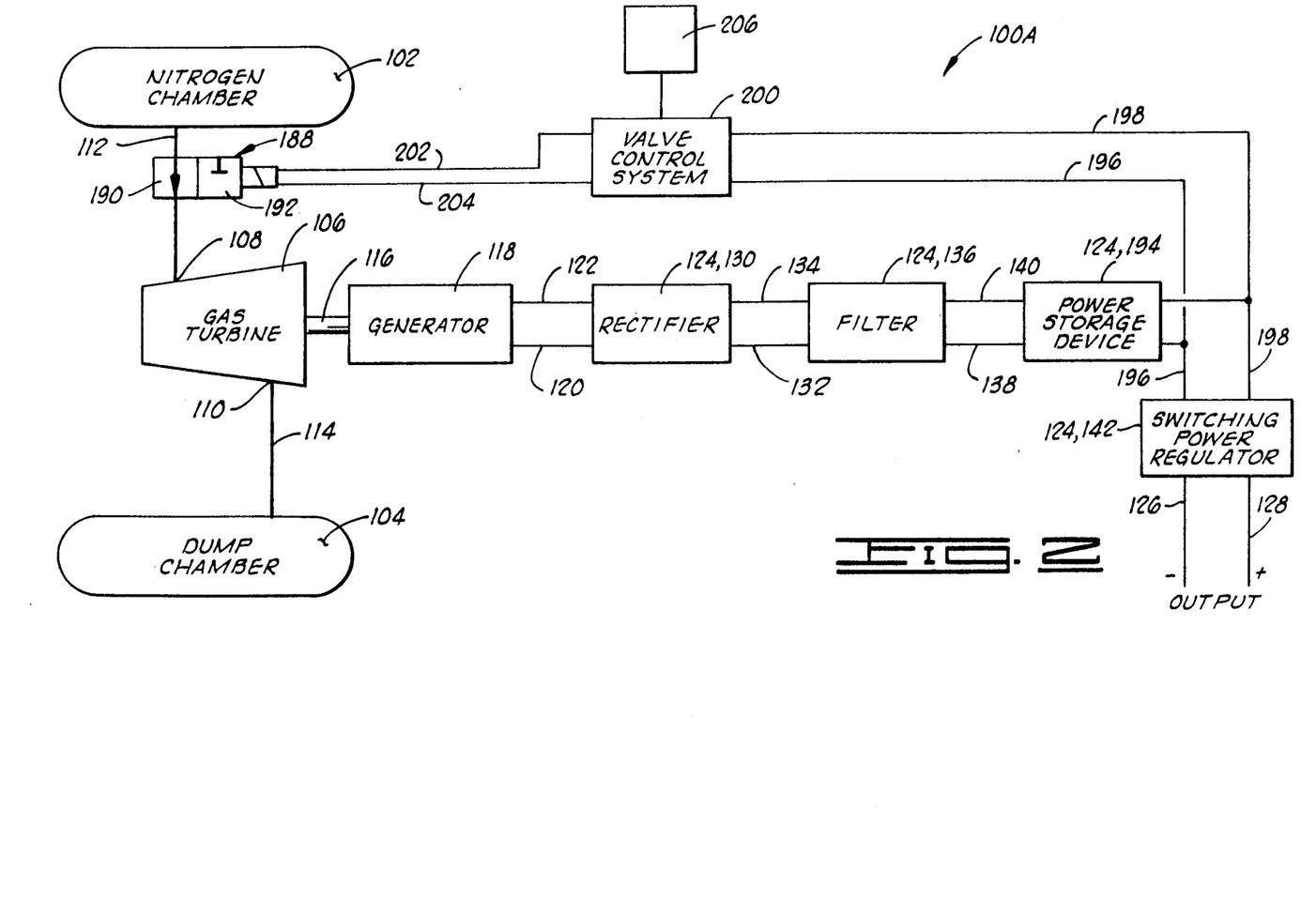
FIG. 2 is a schematic illustration of a first embodiment of the downhole electrical power supply apparatus of the present invention, utilizing compressed nitrogen gas as a high pressure source and an atmospheric dump chamber as a low pressure discharge zone.

The Embodiment Of FIG. 2

A first embodiment of the present invention is shown schematically in FIG. 2 and generally designated by the numeral 100A. The downhole electrical supply apparatus 100A includes a high fluid pressure source zone 102 which in this embodiment is a sealed nitrogen chamber filled with compressed nitrogen gas. The apparatus 100A further includes a low pressure fluid discharge zone 104 which in this embodiment is a substantially atmospheric pressure dump chamber.

A fluid powered engine 106 which in this embodiment is a gas turbine 106 has a high pressure fluid inlet 108 and a low pressure fluid discharge outlet 110. A supply passage 112 communicates nitrogen chamber 102 with inlet 108 of gas turbine 106, and a discharge passage 114 communicates outlet 110 of gas turbine 106 with the dump chamber 104.

As the nitrogen gas flows from chamber 102 and expands through gas turbine 106 and exits to the dump chamber 104, a shaft 116 of turbine 106 is rotated thus providing a rotational mechanical output powered by the fluid flowing from the nitrogen chamber 102 through the turbine 106 to the dump chamber 104.

The shaft 116 turns an electrical powered generating means 118 which converts the rotational mechanical output of the turbine 106 into an alternating current electrical output across leads 120 and 122.

The electrical power supply apparatus 100A further includes a processing means 124 for processing the alternating current electrical output from generator 118 to provide a smoothed direct current electrical output at leads 126 and 128.

The processing means 124 includes a rectifier means 130 which receives the alternating current electrical output from generator 118 and provides either half wave or full wave rectification thereof to provide a rectified voltage which may be described as a varying direct current electrical output across leads 132 and 134.

A filter means 136 then receives the varying direct cur rent electrical output from the rectifier 130 and provides a smoothed direct current electrical output across leads 138 and 140. The filter 136 may be any suitable high inductance filter.

A power storage means 194 receives and stores the smoothed direct current electrical output from the filter 136 and provides that stored electrical output to a regulator 142 as needed.

The power storage means 194 may be a battery, or preferably one or more large capacity capacitors which provide electrical output on leads 196 and 198. The output across leads 196 and 198 is provided to the regulator 142.

The switching power regulator means 142 receives the smoothed direct current electrical output from the filter 136 and produces a constant voltage direct current electrical output at leads 126 and 128.

The output across leads 196 and 198 is also applied to a valve control system means 200 which provides a means for controlling a fluid supply valve 188 in response to a sensed output across leads 196 and 198 from the power storage means 194.

The valve control system means 200 may consist of suitable high and low threshold detectors which detect the voltage at leads 196 and 198 which is output from the storage device 194. When a high energy storage level is detected in the power storage device 194, the control system 200 directs a signal across electrical leads 202 and 204 to the supply valve 188 causing the supply valve 188 to move to its off position 192 thus temporarily ceasing the generation of electrical power. When the electrical power stored in power storage means 194 drops below a second predetermined level, the control system 200 will send a signal to supply valve 188 causing the valve 188 to return to its o position 190 so that electrical power generation will resume.

Regardless of whether the generator 118 is generating electrical power, the regulator 142 may draw power as necessary from power storage device 194 so that a constant power output is continuously available at leads 126 and 128.

The valve control system 200 may be a microprocessor based valve control system. It may also be remotely controlled in response to command signals received by a sensor 206 and transmitted from a surface location such as 208 (see FIG. 1). More generally, the control system 200 can receive command signals in any of numerous ways which are further described below.

The power capacity of the electrical power supply apparatus 100A of FIG. 2 is a direct function of the amount of nitrogen stored within the nitrogen chamber 102 for controlled release through the gas turbine 106. Calculations show that the energy density of a compressed nitrogen system such as that of FIG. 2, that utilizes a nitrogen chamber and an associated dump chamber 104, is comparable to that of lithium battery packs.

Figure 3:
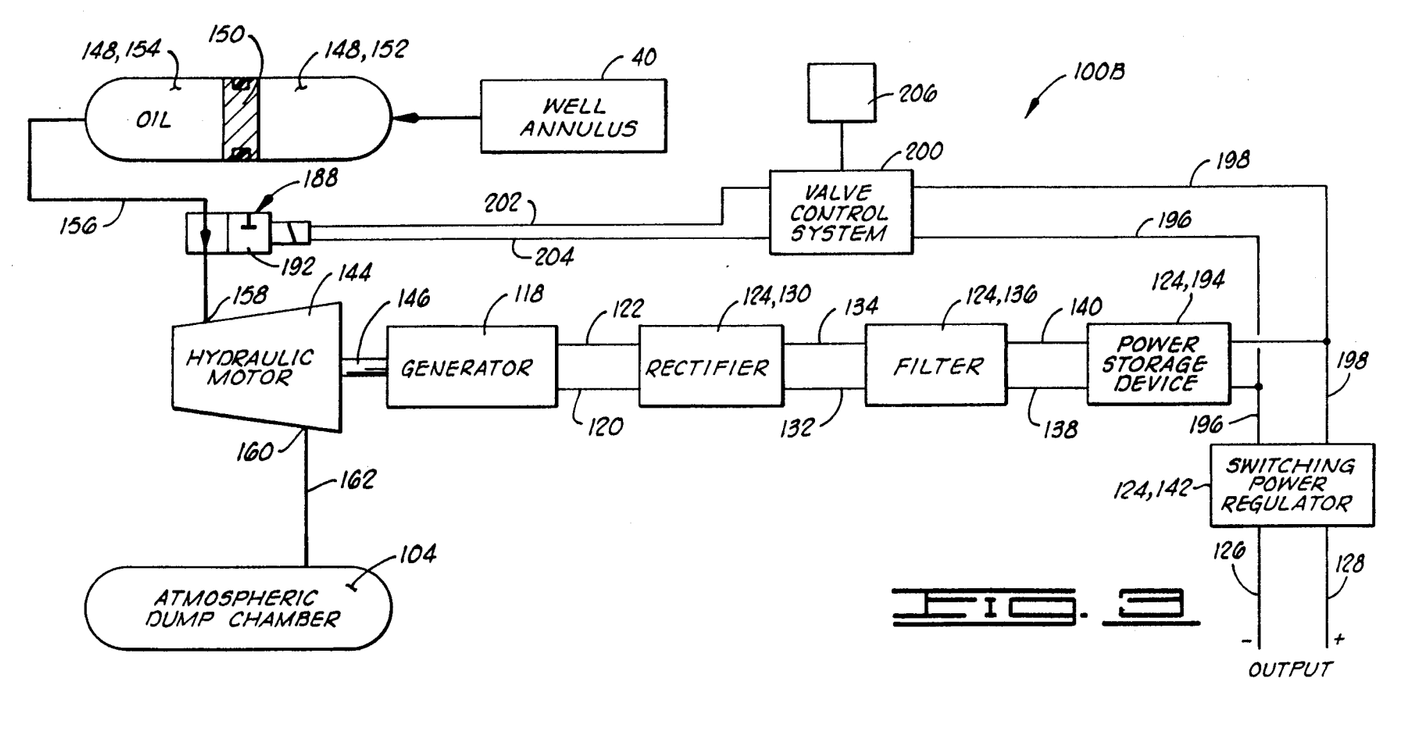
FIG. 3 is a schematic illustration of a second embodiment of the invention wherein the high pressure source zone is pressurized by communication with a well annulus surrounding the tool.

The Embodiment of FIG. 3

The electrical power supply apparatus of FIG. 3 is generally designated by the numeral 100B and is modified in several aspects as compared to the system of FIG. 2. In this embodiment, a hydraulic motor 144 has replaced the gas turbine 106. The hydraulic motor 144 may also be generally described as a fluid powered engine means 144. The motor 144 has an output shaft 146.

The generator 118 and electrical processing means 124 and various components thereof are identical to those previously described with regard to FIG. 2, and identical identifying numerals are utilized.

The embodiment of FIG. 3 is further modified in that instead of using compressed nitrogen as a high pressure fluid source, an isolation chamber 148 is provided which has an isolation piston 150 slidably disposed therein separating the isolation chamber 148 into a well side chamber portion 152 and a tool side chamber portion 154. The well side chamber portion 152 is in fluid flow communication with the well annulus 40 surrounding the tool 100B so that well fluid from the annulus 40 can flow into the well side chamber portion 152. The isolation piston 150 communicates the hydrostatic pressure of the well fluid in annulus 40 to a clean hydraulic fluid contained in the tool side chamber portion 154.

The supply conduit 156 supplies the hydraulic fluid from tool side chamber portion 154 to high pressure inlet 158 of the hydraulic motor 144. That hydraulic fluid flows through the hydraulic motor 144 turning the shaft 146 and exits low pressure fluid outlet 160. A discharge conduit 162 carries the spent hydraulic fluid to the atmospheric dump chamber 104.

Thus in the embodiment of FIG. 3, the fluid pressure differential which powers the hydraulic motor 144 is the differential defined between a well annulus 40 and the atmospheric dump chamber 104. The hydraulic motor 144 is isolated from contaminating contact with the well fluids by the isolation piston 150 which transfers the well annulus pressure to the clean oil in the tool side chamber portion 154.

The power capacity of the embodiment 100B of FIG. 3 is a function of the volume of hydraulic fluid stored within the tool side chamber portion 154 when the apparatus 100B is first placed in the well.

It is noted that in the embodiment of FIG. 3, the isolation chamber 148 may be generally described as a high fluid pressure source zone 148 which is at least partially defined in the apparatus 100B. The high pressure fluid source zone may also be considered to be further defined by the surrounding well annulus 40 which is communicated therewith.

Figure 4:
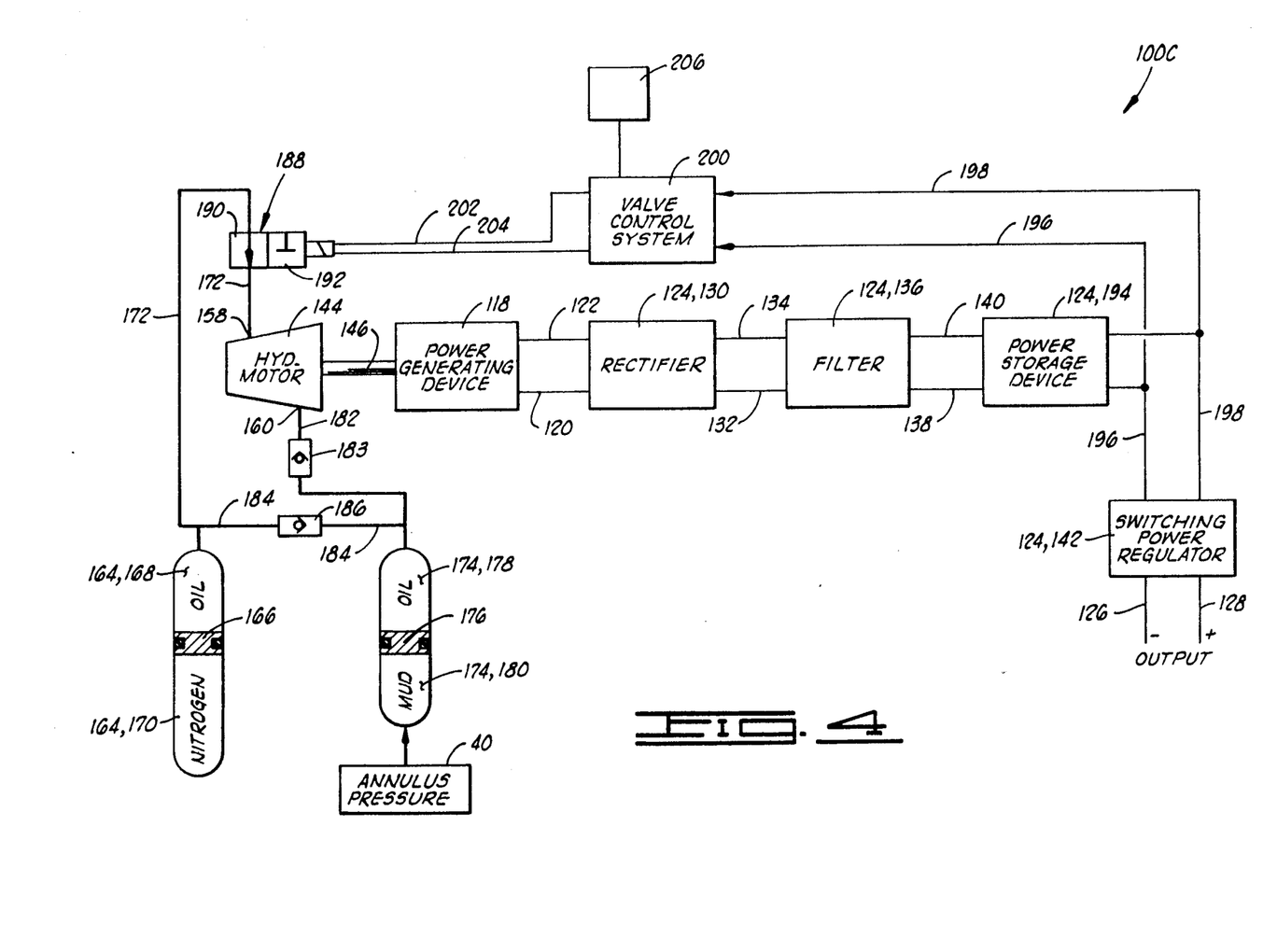
FIG. 4 is a schematic illustration of a third embodiment of the invention in which the low pressure discharge zone is communicated with the well annulus surrounding the tool, and wherein a means is provided for recompressing the nitrogen gas in the high pressure source zone.

The Embodiment Of FIG. 4

FIG. 4 schematically illustrates a third embodiment of the invention which is generally designated by the numeral 100C.

The electrical generating and processing components of system 100C are substantially identical to those of system 100A in FIG. 2, and are identified by identical numerals as those described above with regard to FIG. 2.

The electrical power supply apparatus 100C of FIG. 4 includes a high pressure fluid source zone 164 defined by a supply chamber having a pressure transfer piston 166 slidably disposed therein dividing the supply chamber into first and second chamber portions 168 and 170.

The first chamber portion 168 is filled with a clean hydraulic fluid and is in fluid flow communication with the hydraulic motor 144 through a supply conduit 172. The second chamber portion 170 is filled with compressed nitrogen gas which is the source of high pressure for the hydraulic fluid which is dispelled from the first chamber portion 168 to power the hydraulic motor 144.

The apparatus 100C includes a low pressure discharge zone 174 defined by an isolation chamber 174 having an isolation piston 176 slidably disposed therein separating the isolation chamber 174 into first and second chamber portions 178 and 180.

The first portion 178 of isolation chamber 174 is filled with clean hydraulic fluid which is spent fluid discharged from the hydraulic motor 144 through discharge conduit 182. A discharge check valve means 183 is disposed in the discharge passage 182 for preventing flow of hydraulic fluid from isolation chamber 174 toward hydraulic motor 144. The second chamber portion 180 of isolation chamber 174 is in fluid flow communication with the well annulus 40 surrounding the apparatus 100C so that the low pressure of the discharge zone or isolation chamber 17 is equal to hydrostatic pressure in the well annulus 40.

Thus, so long as the pressure of the compressed nitrogen gas in second portion 170 of supply chamber 164 exceeds the hydrostatic pressure in the well annulus 40, hydraulic fluid will be expelled from the first portion 168 of supply chamber 164 and forced through the hydraulic motor 144. The supply of energy to the hydraulic motor 144 is also limited by the available supply of hydraulic oil which can be contained in the first chamber portion 168 of supply chamber 164.

A bypass conduit means 184 directly communicates the supply conduit 172 and the discharge conduit 184 and thus directly communicates the first portions 168 and 178 of supply chamber 164 and isolation chamber 174 bypassing the engine means 144.

A one-way check valve means 186 is disposed in the bypass conduit means 184 for permitting flow of hydraulic fluid from the first portion 178 of the isolation chamber 174 through the bypass conduit means 184 to the first portion 168 of supply chamber 170 to recompress the compressed gas in the second portion 170 of supply chamber 164 when annulus pressure in the well annulus 40 is increased to a level greater than the pressure of the compressed gas in second chamber portion 170.

When the apparatus 100C is first placed in the well, it will of course be completely charged with nitrogen in the second portion 170 of supply chamber 164 and the first portion 168 of supply chamber 164 will be filled with hydraulic fluid and will constitute the vast majority of the volume of the supply chamber 164. The isolation chamber 174 on the other hand will contain very little hydraulic fluid in its first chamber portion 178, and the second chamber portion 180 will comprise the vast majority of the volume of isolation chamber 174.

A fluid supply valve 188 disposed in supply conduit 172 controls the flow of hydraulic fluid from the supply chamber 164 to the hydraulic motor 144. The valve 188 has an open position or on position 190 which is illustrated in FIG. 4, and it also has a closed or off position 192. Valve 188 is an electric solenoid valve.

With the valve 188 in its on position 190, pressurized fluid from supply chamber 164 flows through supply conduit 172 to and through the hydraulic motor 144 thus turning the shaft 146. The spent hydraulic fluid goes through discharge conduit 182 into the first portion 178 of isolation chamber 174. The fluid pressure differential which acts across the hydraulic motor 144 is the difference between the pressure of nitrogen in the second chamber portion 170 of supply chamber 164 and the hydrostatic pressure present in the well annulus 40.

After substantially all of the hydraulic fluid has been expelled from the first chamber portion 168 of supply chamber 164 and is received in the first chamber portion 178 of isolation chamber 174, the system 100C would be depleted unless some means were provided for recharging the system. This can be accomplished due to the presence of the bypass conduit means 184 and check valve 186. When it is desired to recharge the supply chamber 164, the supply valve 188 is moved to its closed position 192. Then pressure on the well annulus 40 is increased by applying pressure at the surface so that the pressure in well annulus 40 exceeds the pressure remaining in supply chamber 164, thus allowing the oil in the first portion 178 of isolation chamber 174 to flow through the bypass conduit means 184 and check valve 186 into the first portion 168 of supply chamber 164 thus recompressing the nitrogen gas contained in the second chamber portion 170. Then, the excess pressure is released from the annulus 40, and the fluid supply valve 188 is moved back to its on position 190 and another interval of generation of electrical power is begun.

The Embodiment Of FIG. 5

In FIG. 5 a further modified electrical power supply apparatus 100D is schematically illustrated.

The electrical generating and processing components of system 100D are substantially identical to those of system 100A in FIG. 2, and are identified by identical numerals as those described above with regard to FIG. 2.

The modification in the embodiment of FIG. 5 lies in the hydraulic system utilized to provide a hydraulic pressure differential to drive the hydraulic motor 144. The system of FIG. 5 is designed to operate on the pressure differential present between the annulus pressure in the well annulus 40 and the tubing pressure within the tubing string or testing string 34 of FIG. 1 which is communicated with the rathole 20 of the well and thus can be referred to as tubing pressure 20.

The embodiment of FIG. 5 includes first and second isolation chambers 210 and 212. A first isolation piston 214 is slidably disposed in first isolation chamber 210 and divides the same into a first tool side chamber portion 216 and a first well side chamber portion 218. Similarly, a second isolation piston 220 is slidably disposed in the second isolation chamber 212 dividing the same into a second tool side chamber portion 222 and a second well side chamber portion 224.

A conduit means 226 communicates the first and second tool side chamber portions 216 and 222 with the inlet 158 and outlet 160 of the hydraulic motor 144. Conduit means 226 includes conduit segments 226A-226H.

The apparatus 100 further includes an electric solenoid operated reversing valve means 230. Passages or conduits 232 and 234 communicate the annulus pressure 40 which may be generally referred to as a high pressure zone 40 of the well and the tubing pressure 20 which may be generally referred to as a lower pressure zone of the well, with the reversing valve 230. Passages or conduits 236 and 238 communicate the reversing valve 230 with the well side chamber portions 218 and 224 of first and second isolation chambers 210 and 212, respectively.

The reversing valve means 230 has a first position 240 for communicating the high pressure zone or annulus pressure 40 of the well with the first well side chamber portion 218 of first isolation chamber 210 while simultaneously communicating the low pressure zone of the well, that is the tubing pressure 20, with the second well side chamber portion 224 of second isolation chamber 212.

The reversing valve means 230 has a second position 242 in which this relationship is reversed so that the annulus pressure 40 is communicated with the second isolation chamber 212 and the tubing pressure 20 is communicated with the first isolation chamber 210. Thus, the isolation chambers 210 and 212 alternatingly provide the high pressure source zone and the low pressure discharge zone for the hydraulic motor 144.

A high pressure shuttle check valve means 244 is disposed in the conduit means 226 for communicating the one of the isolation chambers 210 and 212 which is communicated with the high pressure zone 40 with the high pressure fluid inlet 158 of hydraulic motor 144.

A low pressure shuttle check valve means 246 is also disposed in the conduit means 226 for communicating the other of the isolation chambers 210 and 212 with the low pressure outlet 160 of the hydraulic motor 144.

The valve control system 200 previously described also functions as a pressure supply control means which is operably associated with the reversing valve means 230 through electrical lead 248 for switching the reversing valve means 230 alternately between its first and second positions 240 and 242 so that fluid pressure from the high pressure zone 40 of the well is substantially continuously communicated to the hydraulic motor 144 to power the same.

The system 100D of FIG. 5 operates in generally the following manner to power the hydraulic motor 144. Beginning with the reversing valve means 230 in its first position 240 as illustrated in FIG. 5, high fluid pressure from the well annulus 40 is communicated with the first isolation chamber 210 and so long as the fluid supply valve 188 is open, hydraulic oil from the tool side chamber portion 216 of first isolation chamber 210 will be dispelled therefrom and flow past the high pressure shuttle check valve 244 through supply conduit 226D then through the hydraulic motor 144 exiting outlet 160 then through conduit 226H, low pressure shuttle check valve means 246, and conduits 226G and 226E into the tool side chamber portion 222 of second isolation chamber 212. Thus as seen in FIG. 5, the first isolation piston 214 will be moving upward within first isolation chamber 210, and the second isolation piston 220 will be moving downward within second isolation chamber 212.

As the first isolation piston 214 nears the end of its stroke within first isolation chamber 210 it is necessary to reverse the relationship between the isolation chambers 210 and 212. The position of the isolation piston 214 near the end of its stroke can be sensed by various means, or if the control system 200 is microprocessor based the control system 200 can be programmed to calculate the appropriate time for reversal based upon a measurement of the flow to the hydraulic motor 144 or other associated parameter.

In any event, as the isolation piston 214 nears the upward end of its stroke within first isolation chamber 210, a signal is transmitted over electrical lead 248 to move the reversing valve 230 to its second position 242 so that high pressure from the well annulus 40 is now directed to the second isolation chamber and low pressure from the tubing pressure 20 is communicated with the first isolation chamber 210. Then, hydraulic oil from the tool side chamber portion 222 of second isolation chamber 212 will be dispelled through the high pressure shuttle check valve 244 to the inlet 158 of hydraulic motor 144 and then exit the outlet 160 and flow through the low pressure shuttle check valve 246 to be received in the tool side chamber portion 216 of first isolation chamber 210.

This process is repeated as necessary by reversing the position of the reversing valve 230 so that an unlimited power supply is available for the hydraulic motor 144. The clean hydraulic fluid contained in the tool side chamber portions 216 and 222 will flow back and forth therebetween, flowing through the hydraulic motor 144 each time to drive the hydraulic motor 144. Thus a substantially constant flow of hydraulic fluid is provided to the hydraulic motor 144. The flow is only intermittently interrupted for a brief moment as the reversing valve 230 changes position.

Figure 6:
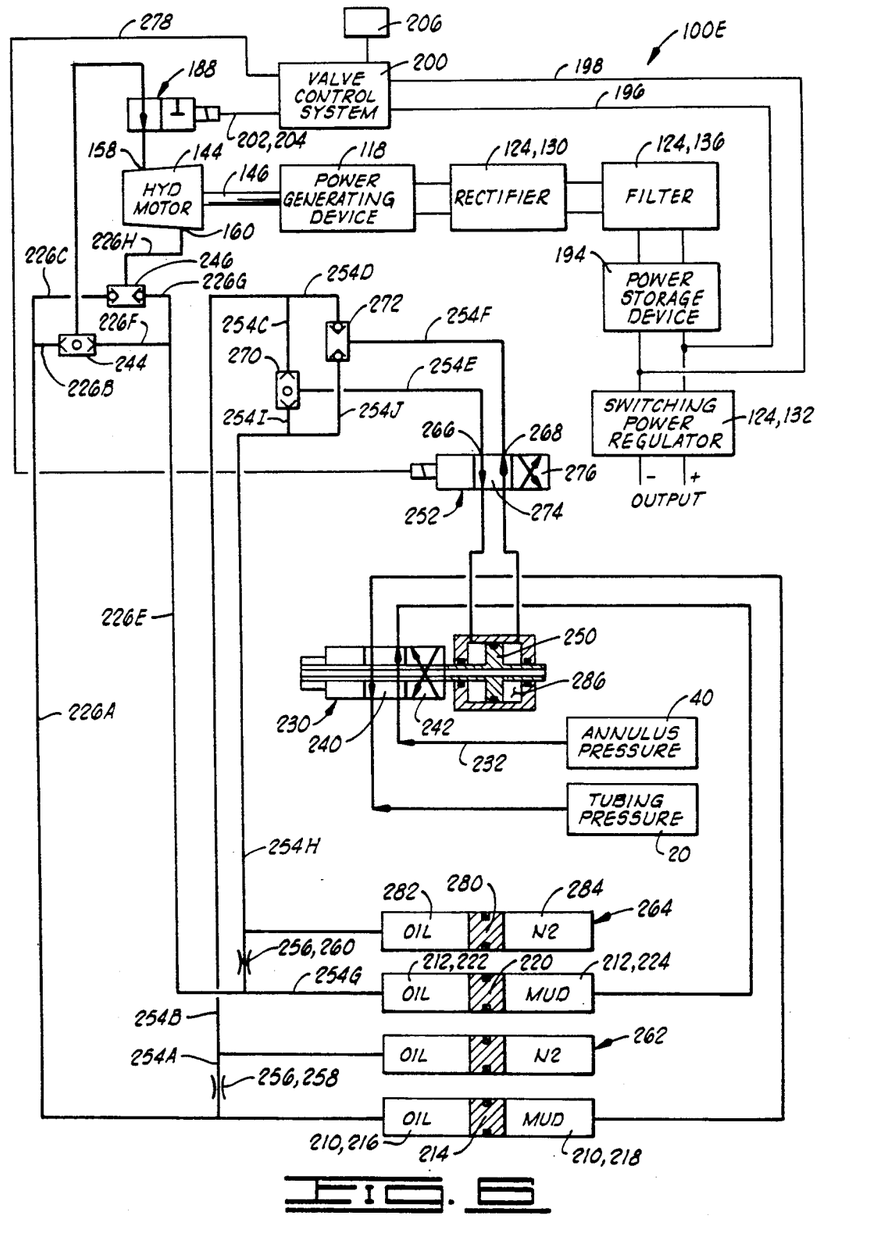
FIG. 6 is a schematic illustration of a fifth embodiment of the invention which like that of FIG. 5 operates on the pressure differential between annulus pressure and tubing pressure. The embodiment of FIG. 6 incorporates a pilot valve arrangement for controlling the reversing valve which controls the fluid pressure relationship in the isolation chambers.
Figure 9:
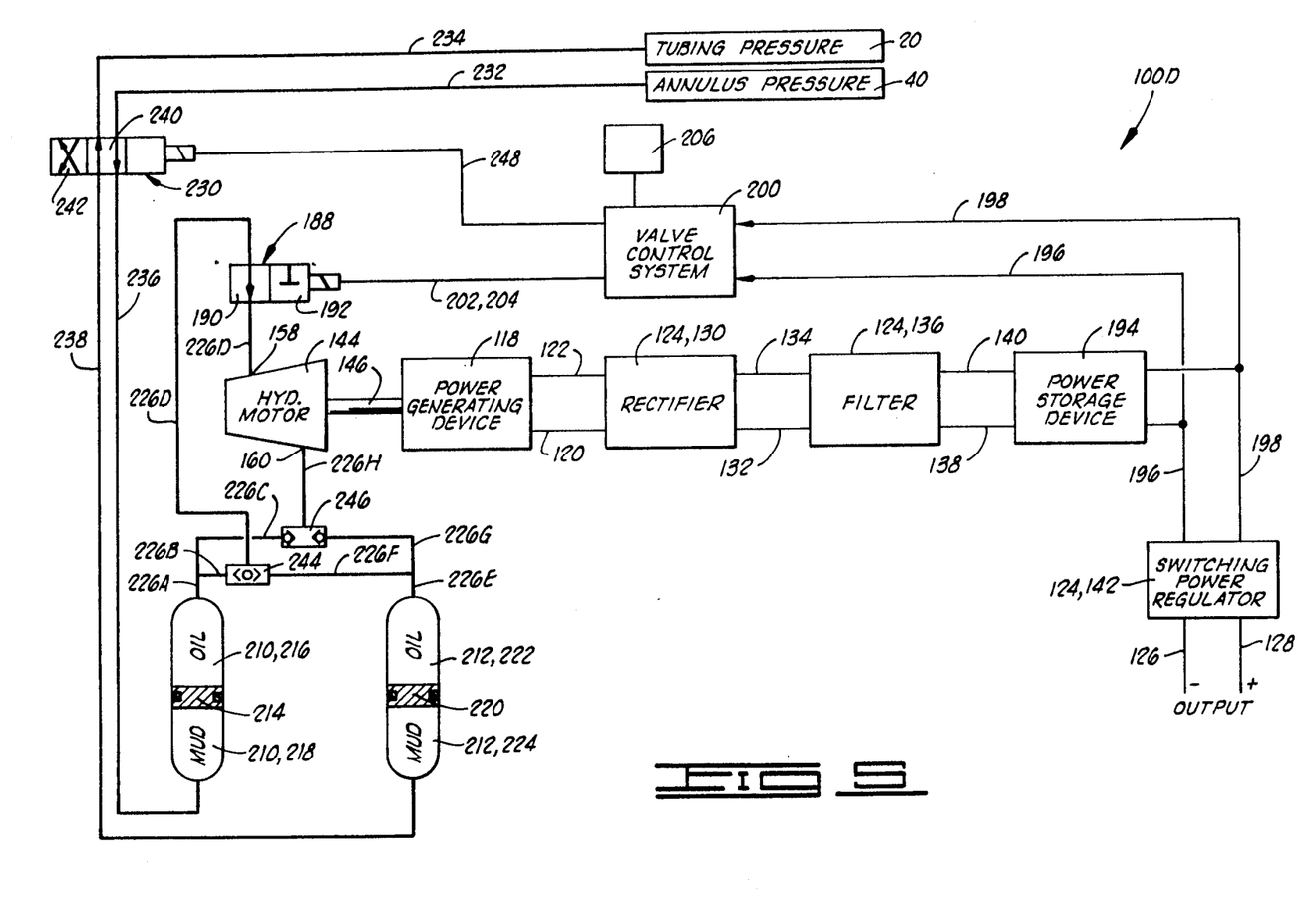

The Embodiment Of FIG. 6

Yet another embodiment of the electrical power supply apparatus of the present invention is shown schematically in FIG. 6 and designated by the numeral 100E. The system of FIG. 6 is similar to that of FIG. 5 in that it operates on the differential between annulus pressure 40 and tubing pressure 20. The system of FIG. 6 is modified in that the reversing valve 230 is no longer an electric solenoid reversing valve, but in this instance is a mechanically actuated reversing valve as further described below.

The system 100E includes a differential pressure actuating piston means 250 operably associated with the reversing valve means 230 for moving the reversing valve means 230 between its first and second positions 240 and 242.

A pilot valve means 252 is provided for selectively applying a fluid pressure differential across the differential pressure actuating piston means 250. The fluid pressure differential applied by pilot valve means 252 is the differential between annulus pressure 40 and tubing pressure 20 which is obtained as described below.

A fluid differential supply passage means 254 made up of passage segments 254A through 254J provides fluid pressure communication between the pilot valve means 252 and the first and second isolation chambers 210 and 212.

A time delay means 256 comprised of first and second fluid flow restrictors 258 and 260 is disposed in the pressure differential supply passage means 254 for delaying communication to the pilot valve means 252 of pressure changes in the first and second isolation chambers 210 and 212.

First and second fluid pressure accumulator means 262 and 264 are connected to the conduit portions 254B and 254H, respectively, for maintaining a fluid pressure between the pilot valve means 252 and the fluid flow restrictors 258 and 260 after the reversing valve means 230 begins a change in position, for a sufficient time to complete a stroke of the differential pressure actuating means 250 to completely reverse the position of reversing valve means 230.

It is noted that the pilot valve means 252 has a fixed high pressure inlet 266 from the pressure differential supply conduit means 254, and a fixed low pressure outlet 268 to the pressure differential supply conduit means 254.

A high pressure shuttle check valve means 270 is disposed in the pressure differential supply conduit means 254 for communicating the fixed high pressure inlet 266 with whichever one of the isolation chambers 210 and 212 is communicated with the high pressure zone 40. A low pressure shuttle check valve means 272 is disposed in the pressure differential supply conduit means 254 for communicating the fixed low pressure outlet 268 with whichever of the isolation chambers 210 and 212 is communicated with the low pressure zone 20.

Consider the system shown in FIG. 6 in a state in which the high pressure from well annulus 40 is communicated with the second isolation chamber 212 and the low pressure from tubing pressure 20 is communicated with the first isolation chamber 210. After a sufficient period of time the high pressure in the second isolation chamber 212 communicates through the second fluid flow restriction 260 so that the same high pressure is present in conduit segments 254H and 254E to the high pressure inlet 266. Similarly, the low pressure from tubing pressure 20 is communicated through the first isolation chamber 210, fluid flow restrictor 258, and conduit segments 254B, 254D, low pressure shuttle check valve 272, and conduit segment 254F to the low pressure outlet 268 of pilot valve means 252.

The pilot valve means 252 has a first position 274 corresponding to the positions of the various components just described. Pilot valve means 252 also has a second position 276.

After the second isolation chamber 212 has dispelled substantially all of the oil in tool side chamber portion 222 through the hydraulic motor 144, it is necessary to reverse the position of the reversing valve means 230. This is accomplished as follows.

An appropriate command signal is sent from control system 200 through electric lead 278 to the pilot valve means 252 which is an electric solenoid pilot valve. This signal causes the pilot valve means 252 to move to its second position 276 which reverses the pressure differential across the actuating piston 250.

As the actuating piston 250 moves the reversing valve means 230 from its first position 240 toward its second position 242, there is somewhat of a "dead spot" between those two positions in which there is no clear communication of the high and low pressure zones 40 and 20 with either of the isolation chambers 210 and 212.

Due to the function of the fluid flow restrictors 258 and 260 and the fluid pressure accumulators 262 and 264, however, a time delay is provided during which the previously existing pressure is maintained in the pressure differential supply passage means and thus is maintained through the pilot valve mean 252 to the actuating piston 250. This is maintained for a sufficient period of time to allow the actuating piston 250 to move the reversing valve means 230 completely to its second position 242. The fluid pressure accumulators 262 and 264 help maintain this previously existing pressure.

Each of the fluid pressure accumulators, such as fluid pressure accumulator 264, has an accumulator piston 280 slidably disposed therein separating the accumulator into an oil chamber 282 and a nitrogen chamber 284. The compressed nitrogen gas in nitrogen chamber 284 serve to store fluid pressure energy. Thus, when the isolation chamber 212 was communicated with the high pressure source 40, that same high pressure was communicated to the fluid pressure accumulator 264 and equalized throughout the oil chamber 282 and nitrogen chamber 284. As the high fluid pressure which was initially present in conduit segment 254H starts dropping off due to the flow of fluid into the right-hand side of actuating chamber 286 in which the actuating piston 250 is received, the nitrogen in nitrogen chamber 284 will expand thus moving the accumulator piston 280 from right to left as seen in FIG. 6 and forcing oil out of oil chamber 282 into the conduit segment 254H to maintain the high fluid pressure therein for a time.

Thus, the fluid flow restrictors 258 and 260 in combination with the fluid pressure accumulators 262 and 264 maintain a sufficient portion of the previously existing pressure differential to the pilot valve means 252 for a sufficient period of time to stroke the actuating piston 250 upon reversal of the pilot valve means 252.

The movement of the actuating piston 250 changes the position of the reversing valve means 230 from its first position 240 to its second position 242 thus reversing the fluid pressure differential between the isolation chambers 210 and 212. After a relatively short time interval has passed, the reversed pressure differential in the isolation chambers 210 and 212 will equalize through the fluid flow restrictors 258 and 260 and into the fluid pressure accumulators 262 and 264

The system will now flow hydraulic fluid from the first isolation chamber 210 through the hydraulic motor 144 to the second isolation chamber 212, until it is time for yet another reversal of position of the reversing valve means 230.

Techniques For Remote Control

Many different systems can be utilized to send command signals from the surface location 26 down to the sensor 206 to control the tool 100.

One suitable system is the signaling of the control package 200, and receipt of feedback from the control package 200, using acoustical communication which may include variations of signal frequencies, specific frequencies, or codes of acoustical signals or combinations of these. The acoustical transmission media includes tubing string, casing string, electric line, slick line, subterranean soil around the well, tubing fluid, and annulus fluid. An example of a system for sending acoustical signals down the tubing string is seen in U.S. Pat. Nos. 4,375,239; 4,347,900; and 4,378,850 all to Barrington and assigned to the assignee of the present invention.

A second suitable remote control system is the use of a mechanical or electronic pressure activated control package 200 which responds to pressure amplitudes, frequencies, codes or combinations of these which may be transmitted through tubing fluid, casing fluid, fluid inside coiled tubing which may be transmitted inside or outside the tubing string, and annulus fluid. The system can also respond to a sensed downhole pressure.

A third remote control system which may be utilized is radio transmission from the surface location or from a sub-surface location, with corresponding radio feedback from the tool 100 to the surface location or subsurface location.

A fourth possible remote control system is the use of microwave transmission and reception.

A fifth type of remote control system is the use of electronic communication through an electric line cable suspended from the surface to the downhole control package.

A sixth suitable remote control system is the use of fiberoptic communications through a fiberoptic cable suspended from the surface to the downhole control package.

A seventh possible remote control system is the use of acoustic signaling from a wire line suspended transmitter to the downhole control package with subsequent feedback from the control package to the wire line suspended transmitter/receiver. Communication may consist of frequencies, amplitudes, codes or variations or combinations of these parameters.

An eighth suitable remote communication system is the use of pulsed X-ray or pulsed neutron communication systems.

As a ninth alternative, communication can also be accomplished with the transformer coupled technique which involves wire line conveyance of a partial transformer to a downhole tool. Either the primary or secondary of the transformer is conveyed on a wire line with the other half of the transformer residing within the downhole tool. When the two portions of the transformer are mated, data can be interchanged.

All of the systems described above may utilize an electronic control package 200 that is microprocessor based.

It is also possible to utilize a preprogrammed microprocessor based control package 200 which is completely self-contained and is programmed at the surface to provide a pattern of operation of the downhole tool which it controls. For example, a remote signal from the surface could instruct the microprocessor based electronic control package 200 to start one or more preprogrammed sequences of operations. Also the preprogrammed sequence could be started in response to time lapse or to a sensed downhole parameter such as bottom hole pressure. Such a self-contained system may be constructed in a manner analogous to the self-contained downhole gauge system shown in U.S. Pat. No. 4,866,607 to Anderson et al., and assigned to the assignee of the present invention.

Thus it is seen that the apparatus and methods of the present invention readily achieve the ends and advantages mentioned as well as those inherent therein. While certain preferred embodiments of the invention have been described and illustrated for purposes of the present disclosure, numerous changes may be made by those skilled in the art which changes are encompassed within the scope and spirit of the present invention as defined by the appended claims.

What is claimed is:

1. A downhole electrical power supply apparatus, comprising:
    a high fluid pressure source zone defined at least partially in said apparatus;
    a low fluid pressure discharge zone defined at least partially in said apparatus;
    a fluid powered engine means, for providing a rotational mechanical output powered by fluid flowing from said source zone through said engine means to said discharge zone;
    a fluid supply valve means between said source zone and said discharge zone for controlling flow of fluid from said source zone through said engine means; and
    electrical power generating means for converting said rotational mechanical output of said engine means into electrical output.

2. The apparatus of claim 1, wherein:
    said generating means is further characterized as a means for generating an alternating current electrical output; and
    said apparatus further includes a processing means for processing said alternating current electrical output to provide a smoothed direct current electrical output.

3. The apparatus of claim 2, wherein said processing means comprises:
    a rectifier mean for receiving said alternating current electrical output from said generating mean and for providing a varying direct current electrical output;
    a filter means for receiving said varying direct current electrical output from said rectifier means and for producing a smoothed direct current electrical output; and
    a regulator means for receiving said smoothed direct current electrical output from said filter means and for producing a constant voltage direct current electrical output.

4. The apparatus of claim 3, further comprising:
means and said regulator means, for receiving and storing said smoothed direct current electrical output from said filter means and for providing electrical output to said regulator means.

5. The apparatus of claim 4, further comprising:
    valve control system means for controlling said fluid supply valve means in response to a sensed output from said power storage means.

6. The apparatus of claim 5, wherein:
    said valve control system means includes a microprocessor.

7. The apparatus of claim 1, further comprising:
    a power storage means for storing said electrical output.

8. The apparatus of claim 7, further comprising:
    valve control system means for controlling said fluid supply valve means in response to a sensed output from said power storage means.

9. The apparatus of claim 8, wherein:
    said valve control system means includes a microprocessor.

10. A downhole electrical power supply apparatus, comprising:
    a high fluid pressure source zone defined at least partially in said apparatus;
    a low fluid pressure discharge zone defined at least partially in said apparatus;
    a fluid powered engine means, for providing a rotational mechanical output powered by fluid flowing from said source zone through said engine means to said discharge zone;
    electrical power generating means for converting said rotational mechanical output of said engine means into electrical output; and
    wherein said discharge zone is a substantially atmospheric dump chamber defined entirely in said apparatus.

11. A downhole electrical power supply apparatus, comprising:
    a high fluid pressure source zone defined at least partially in said apparatus;
    a low fluid pressure discharge zone defined at least partially in said apparatus;
    a fluid powered engine means, for providing a rotational mechanical output powered by fluid flowing from said source zone through said engine means to said discharge zone;
    electrical power generating means for converting said rotational mechanical output of said engine means into electrical output;
    wherein said high fluid pressure source zone is an enclosed container filled with compressed nitrogen gas; and
    wherein said fluid powered engine means is a gas turbine driven by said compressed nitrogen gas from said source zone and venting spent nitrogen gas to said discharge zone.

12. A downhole electrical power supply apparatus, comprising:
   a high fluid pressure source zone defined at least partially in said apparatus;
   a low fluid pressure discharge zone defined at least partially in said apparatus;
   a fluid powered engine means, for providing a rotational mechanical output powered by fluid flowing from said source zone through said engine means to said discharge zone;
   electrical power generating means for converting said rotational mechanical output of said engine means into electrical output;
   wherein said high fluid pressure source includes an isolation chamber having an isolation piston slidably disposed therein separating said isolation chamber into a well side chamber portion and a tool side chamber portion, said well side chamber portion being in fluid flow communication with a well annulus surrounding said apparatus, said tool side chamber portion being filled with a clean hydraulic fluid; and
   wherein said fluid powered engine is powered by said clean hydraulic fluid flowing from said tool side chamber portion of said isolation chamber through said engine.

13. A downhole electrical power supply apparatus, comprising:
   a high fluid pressure source zone defined at least partially in said apparatus;
   a low fluid pressure discharge zone defined at least partially in said apparatus;
   a fluid powered engine means, for providing a rotational mechanical output powered by fluid flowing from said source zone through said engine means to said discharge zone;
   electrical power generating means for converting said rotational mechanical output of said engine means into electrical output;
   wherein said high fluid pressure source includes a supply chamber having a pressure transfer piston slidably disposed therein dividing said supply chamber into first and second portions, said first portion being filled with a clean hydraulic fluid and being in fluid flow communication with said engine means, and said second portion being filled with a compressed gas so that said high pressure of said source zone is equal to the pressure of said compressed gas; and
   wherein said low pressure discharge zone includes an isolation chamber having an isolation piston slidably disposed therein separating said isolation chamber into first and second portions, said first portion being filled with a clean hydraulic fluid and being in fluid flow communication with said engine means, and said second portion being in fluid flow communication with a well annulus surrounding said apparatus so that the low pressure of said discharge zone is equal to hydrostatic pressure in said well annulus.

14. The apparatus of claim 13, further comprising:
   bypass conduit means for bypassing said engine means and directly communicating said first portions of said supply chamber and said isolation chamber with each other; and
   one-way check valve means, disposed in said bypass conduit means, for permitting flow of hydraulic fluid from said first portion of said isolation chamber through said bypass conduit means to said first portion of said supply chamber to recompress said compressed gas when annulus pressure in said well annulus is increased to a level greater than the pressure of said compressed gas.

15. A downhole electrical power supply apparatus, comprising:
   a high fluid pressure source zone defined at least partially in said apparatus;
   a low fluid pressure discharge zone defined at least partially in said apparatus;
   a fluid powered engine means, for providing a rotational mechanical output powered by fluid flowing from said source zone through said engine means to said discharge zone;
   electrical power generating means for converting said rotational mechanical output of said engine means into electrical output;
   first and second isolation chambers;
   a first isolation piston slidably disposed in said first isolation chamber and dividing said first isolation chamber into a first tool side chamber portion and a first well side chamber portion;
   a second isolation piston slidably disposed in said second isolation chamber and dividing said second isolation chamber into a second tool side chamber portion and a second well side chamber portion;
   conduit means for communicating said first and second tool side chamber portions with said fluid powered engine means; and
   reversing valve means having a first position for communicating a high pressure zone of said well with said first well side chamber portion while simultaneously communicating a low pressure zone of said well with said second well side chamber portion, and having a second position for communicating said high pressure zone with said second well side chamber portion while simultaneously communicating said low pressure zone with said first well side chamber portion, so that said first and second isolation chambers alternatingly define said source zone and said discharge zone.

16. The apparatus of claim 15, further comprising:
   pressure supply control means, operably associated with said reversing valve means, for switching said reversing valve means alternately between its said first and second positions so that fluid pressure from said high pressure zone of said well is substantially continuously communicated to said fluid powered engine means.

17. The apparatus of claim 16, wherein:
   said reversing valve means is an electric solenoid operated reversing valve means; and
   said pressure supply control means is a means for controlling said electric solenoid of said reversing valve means.

18. The apparatus of claim 15, further comprising:
   said fluid powered engine means having a high pressure inlet and a low pressure outlet;
   high pressure shuttle check valve means, disposed in said conduit means, for communicating the one of said isolation chambers which is communicated with said high pressure zone with said high pressure inlet of said fluid powered engine means; and low pressure shuttle check valve means disposed in said conduit means for communicating the other of said isolation chambers with said low pressure outlet of said fluid powered engine means.

19. The apparatus of claim 15, further comprising:
a differential pressure actuating piston means, operably associated with said reversing valve means, for moving said reversing valve means between its said first and second positions; and
a pilot valve means for selectively applying a fluid pressure differential across said differential pressure actuating piston means.

20. The apparatus of claim 19, further comprising:
pressure differential supply means for providing fluid pressure communication between said pilot valve means and each of said first and second isolation chambers, so that said fluid pressure differential is the differential between said high and low pressure zones.

21. The apparatus of claim 20, further comprising:
time delay means for delaying communication to said pilot valve means of pressure changes in said first and second isolation chambers; and
fluid pressure accumulator means for maintaining a pressure between said pilot valve means and said time delay means, after said reversing valve means begins changing position for a sufficient time to complete a stroke of said differential pressure actuating piston means.

22. The apparatus of claim 20, further comprising:
said pilot valve means having a fixed high pressure inlet from said pressure differential supply means and a fixed low pressure outlet to said pressure differential supply means;
high pressure shuttle check valve means, disposed in said pressure differential supply means, for communicating said fixed high pressure inlet with the one of said isolation chambers which is communicated with said high pressure zone; and
low pressure shuttle check valve means, disposed in said pressure differential supply means, for communicating said fixed low pressure outlet with the other of said isolation chambers.

23. A downhole electrical power supply apparatus, comprising:
a high fluid pressure source zone defined at least partially in said apparatus;
a low fluid pressure discharge zone defined at least partially in said apparatus;
a fluid powered engine means, for providing a rotational mechanical output powered by fluid flowing from said source zone through said engine means to said discharge zone;
electrical power generating means for converting said rotational mechanical output of said engine means into electrical output;
wherein said high fluid pressure source means is in fluid pressure communication with a well annulus surrounding said apparatus; and
wherein said low pressure discharge zone is in fluid pressure communication with tubing pressure in a tubing string by which said apparatus is suspended in a well.

24. A method of generating electrical power downhole in a well, comprising:
(a) placing downhole in said well a tubing string including a power supply apparatus having a high fluid pressure source zone and a low fluid pressure discharge zone defined at least partially therein, said tubing string having a tubing string bore, said source zone being a zone other than said tubing string bore;
(b) flowing power fluid from said source zone through a fluid powered engine to said discharge zone and thereby creating a rotational mechanical output from said engine; and
(c) turning an electrical power generator with said rotational mechanical output and thereby generating an electrical output.

25. The method of claim 24, wherein:
said step (c) is further characterized as generating an alternating current electrical output; and
said method further comprises a step of processing said alternating current electrical output to provide a smoothed direct current electrical output.

26. The method of claim 25, wherein said processing step comprises:
rectifying said alternating current electrical output from said generator and providing a varying direct current electrical output;
filtering said varying direct current electrical output and producing a smoothed direct current electrical output; and
regulating said smoothed direct current electrical output and producing a constant voltage direct current electrical output 27. The method of claim 26, further comprising:
storing said smoothed direct current electrical output in a storage device.

28. The method of claim 27, further comprising:
controlling flow of said power fluid to said engine in response to a sensed output from said storage device.

29. A method of generating electrical power downhole in a downhole generating system in place in a tubing string located in a well, comprising:
(a) isolating first and second well zones from each other, said first zone being a zone other than a tubing string bore of said tubing string, said zones having a hydraulic differential pressure potential energy therebetween due to a pressure difference therebetween when said zones are in a static state with no well fluid flowing therebetween;
(b) flowing well fluid from said first zone through said downhole generating system into said second zone;
(c) converting said hydraulic differential pressure potential energy between said first and second well zones into mechanical kinetic energy of fluid powered engine as said well fluid flows through said generating system; and
(d) converting said mechanical kinetic energy of said engine into electrical output of an electrical generator.

30. The method of claim 29, further comprising:
isolating said fluid powered engine from contact with said well fluid flowing through said system.

* * * * *